(12) United States Patent
Yoo et al.

(10) Patent No.: US 9,425,915 B2
(45) Date of Patent: Aug. 23, 2016

(54) INTERFERENCE CANCELLATION

(71) Applicant: QUALCOMM Incorporated, San Diego, CA (US)

(72) Inventors: Taesang Yoo, San Diego, CA (US); Tao Luo, San Diego, CA (US); Lu Zhao, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 210 days.

(21) Appl. No.: 14/248,076

(22) Filed: Apr. 8, 2014

(65) Prior Publication Data

US 2014/0269246 A1    Sep. 18, 2014

Related U.S. Application Data

(63) Continuation-in-part of application No. 13/096,667, filed on Apr. 28, 2011, now Pat. No. 8,737,187.

(60) Provisional application No. 61/330,192, filed on Apr. 30, 2010.

(51) Int. Cl.
*H04B 15/00* (2006.01)
*H04J 3/10* (2006.01)
*H04L 5/00* (2006.01)
*H04J 11/00* (2006.01)
(Continued)

(52) U.S. Cl.
CPC . *H04J 3/10* (2013.01); *H04B 15/00* (2013.01); *H04J 11/0056* (2013.01); *H04L 5/0051* (2013.01); *H04L 5/0062* (2013.01); *H04L 5/0073* (2013.01); *H04L 5/005* (2013.01); *H04L 5/0048* (2013.01); *H04L 25/0204* (2013.01); *H04L 25/0224* (2013.01); *H04W 24/10* (2013.01)

(58) Field of Classification Search
CPC ... H04L 5/0051; H04L 5/0062; H04L 5/0073; H04B 15/00; H04J 3/10; H04J 11/0056
See application file for complete search history.

(56) References Cited

U.S. PATENT DOCUMENTS

| 8,737,187 | B2 | 5/2014 | Yoo et al. | |
| 2007/0121554 | A1 | 5/2007 | Luo et al. | |
| 2007/0242782 | A1* | 10/2007 | Han | H04B 1/7105 375/343 |

(Continued)

FOREIGN PATENT DOCUMENTS

| CN | 101433038 A | 5/2009 |
| EP | 2597793 A1 | 5/2013 |

(Continued)

OTHER PUBLICATIONS

Damnjanovic A., et al., "A Survey on 3GPP Heterogeneous Networks, Wireless Communications", IEEE, Jun. 2011, vol. 18, No. 3, pp. 10-21.

(Continued)

*Primary Examiner* — Omar Ghowrwal
(74) *Attorney, Agent, or Firm* — Dalei Dong

(57) ABSTRACT

A method to enhance coverage and/or throughput in a heterogeneous wireless network includes detecting interference between a neighboring cell and a serving cell. The method also includes cancelling the interference using an adaptive technique based on whether the interference has colliding Common Reference Signal (CRS) tones or whether the interference has colliding Dedicated Reference Signal (DRS) tones.

12 Claims, 16 Drawing Sheets

(51) Int. Cl.
*H04L 25/02* (2006.01)
*H04W 24/10* (2009.01)

(56) References Cited

U.S. PATENT DOCUMENTS

| | | | |
|---|---|---|---|
| 2008/0123616 | A1 | 5/2008 | Lee et al. |
| 2008/0248773 | A1 | 10/2008 | De Carvalho et al. |
| 2010/0008282 | A1 | 1/2010 | Bhattad et al. |
| 2010/0009634 | A1 | 1/2010 | Budianu et al. |
| 2010/0020771 | A1 | 1/2010 | Ji et al. |
| 2010/0309867 | A1 | 12/2010 | Palanki et al. |
| 2010/0309876 | A1 | 12/2010 | Khandekar et al. |
| 2011/0267937 | A1 | 11/2011 | Yoo et al. |

FOREIGN PATENT DOCUMENTS

| | | | |
|---|---|---|---|
| KR | 20080090066 | A | 10/2008 |
| KR | 20090008274 | A | 1/2009 |
| WO | WO-2009099810 | | 8/2009 |
| WO | WO-2010141912 | A2 | 12/2010 |
| WO | WO-2010141913 | A2 | 12/2010 |
| WO | 2013154382 | A1 | 10/2013 |

OTHER PUBLICATIONS

International Search Report and Written Opinion—PCT/US2011/034501—ISA/EPO—Oct. 7, 2011.

NTT Docomo: "Interference Coordination for Non-CA-based Heterogeneous Networks", 3GPP Draft; R1-102307 ICIC for Non-CA Hetnet, 3rd Generation Partnership Project (3GPP), Mobile Competence Centre ; 650, Route Des Lucioles ; F-06921 Sophia-Antipolis Cedex ; France, vol. RAN WG1, no. Beijing, china; Apr. 12, 2010, Apr. 7, 2010, XP050419698, [retrieved on Apr. 7, 2010].

Panasonic, Possibility of UE Side ICI Cancellation in Hetnet, 3GPP R1-101274, Feb. 26, 2010.

Qualcomm Incorporated: "Data channel ICIC and the benefits of possible extensions", 3GPP Draft; R1-104819 Data Channel ICIC and the Benefits of Possible Extensions, 3rd Generation Partnership Project (3GPP), Mobile Competence Centre ; 650, Route Des Lucioles ; F-06921 Sophia-Antipolis Cedex ; France, vol. RAN WGI, no. Madrid, Spain; Aug. 23, 2010, Aug. 17, 2010, XP050450003, [retrieved on Aug. 17, 2010] p. 2, paragraph 3.

Qualcomm Incorporated: "Techniques to Cope with High Interference in Heterogeneous Networks," 3GPP TSG-RAN WG1#59bis, 3GPP, R1-100702, Jan. 22, 2009.

International Search Report and Written Opinion—PCT/US2015/024997—ISA/EPO—Jun. 22, 2015.

\* cited by examiner

INTERFERENCE CANCELLATION

CROSS-REFERENCE TO RELATED APPLICATION

This application is a continuation-in-part patent application of U.S. patent application Ser. No. 13,096,667, entitled INTERFERENCE CANCELLATION, filed on Apr. 28, 2011, now U.S. Pat. No. 8,737,187 B2, which claims the benefit under 35 U.S.C. §119(e) to U.S. Provisional Patent Application No. 61/330,192 entitled SYSTEMS AND METHODS FOR PROVIDING INTERFERENCE CANCELLATION IN WIRELESS COMMUNICATION NETWORKS, filed on Apr. 30, 2010, the disclosures of which are expressly incorporated by reference herein in their entireties

BACKGROUND

1. Field

Aspects of the present disclosure relate generally to wireless communication systems, and more particularly, to systems and methods for providing interference cancellation.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

According to some aspects of the disclosure, a method to enhance coverage and/or throughput in a heterogeneous wireless network includes detecting interference between a neighboring cell and a serving cell. The method may also include cancelling the interference using an adaptive technique based on whether the interference has colliding Common Reference Signal (CRS) tones. The method may include cancelling the interference using an adaptive technique based on whether the interference has colliding Dedicated Reference Signal (DRS) tones (e.g., Demodulation Reference Signal (DMRS) tones). For example, the Dedicated Reference Signal (DRS) may include User Equipment Reference Signal (UE-RS), Demodulation Reference Signal (DMRS) and/or other user equipment specific reference signals.

According to some aspects of the disclosure, an apparatus to enhance coverage and/or throughput in a heterogeneous wireless network includes means for detecting interference between a neighboring cell and a serving cell. The apparatus may also include means for cancelling the interference using an adaptive technique based on whether the interference has colliding Common Reference Signal (CRS) tones. The apparatus may include means for cancelling the interference using an adaptive technique based on whether the interference has colliding Dedicated Reference Signal (DRS) tones (e.g., Demodulation Reference Signal (DMRS) tones).

According to some aspects of the disclosure, an apparatus to enhance coverage and/or throughput in a heterogeneous wireless network includes a memory and at least one processor coupled to the memory. The processor(s) is configured to detect interference between a neighboring cell and a serving cell. The processor(s) is further configured to cancel the interference using an adaptive technique based on whether the interference has colliding Common Reference Signal (CRS) tones. The processor(s) is configured to cancel the interference using an adaptive technique based on whether the interference has colliding Dedicated Reference Signal (DRS) tones (e.g., Demodulation Reference Signal (DMRS) tones).

According to some aspects of the disclosure, a computer program product to enhance coverage and/or throughput in a heterogeneous wireless network includes a computer-readable medium having non-transitory program code recorded thereon. The program code includes program code to detect interference between a neighboring cell and a serving cell. The program code also includes program code to cancel the interference using an adaptive technique based on whether the interference has colliding Common Reference Signal (CRS) tones. The program code may include program code to cancel the interference using an adaptive technique based on whether the interference has colliding Dedicated Reference Signal (DRS) tones (e.g., Demodulation Reference Signal (DMRS) tones).

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
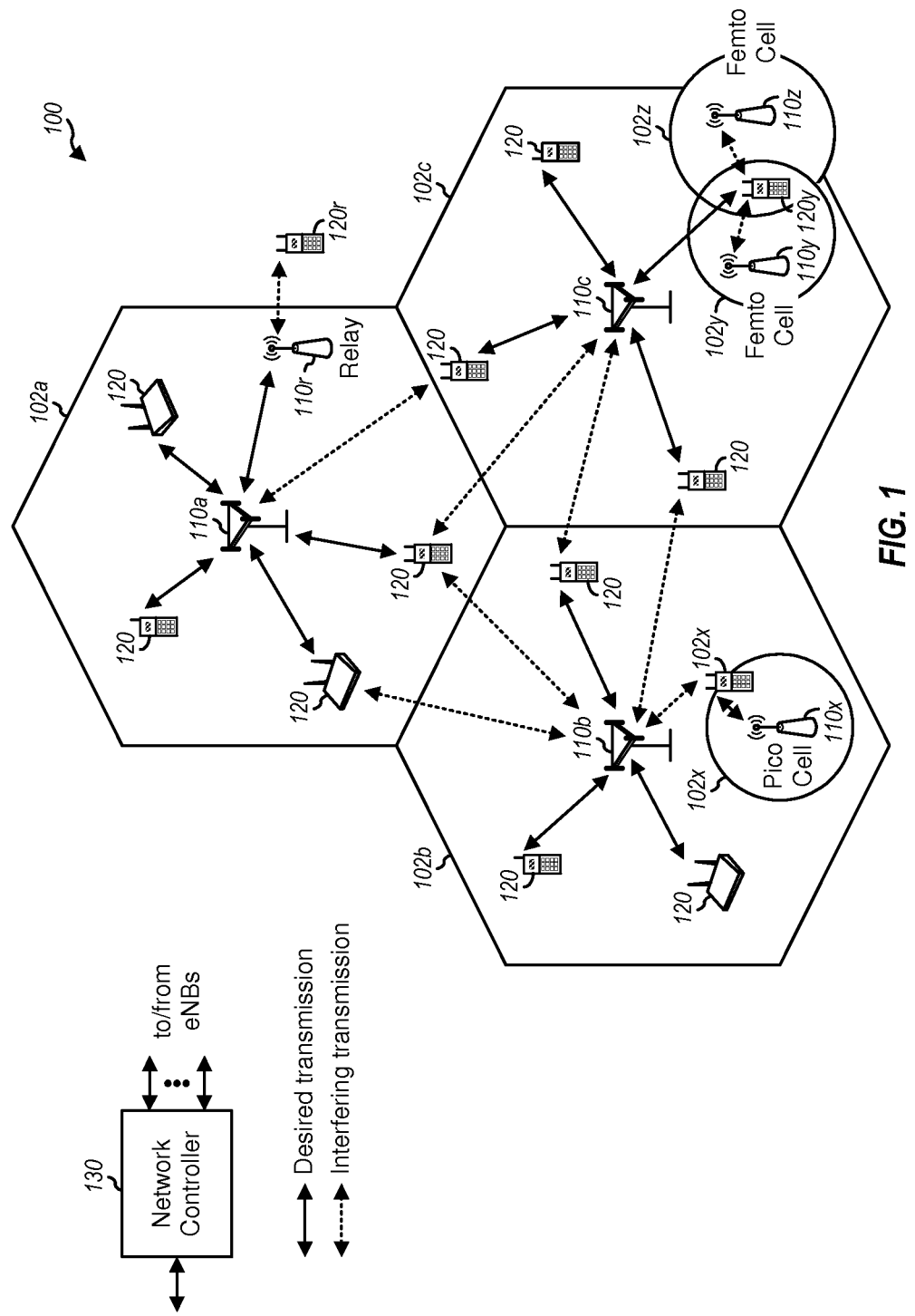
FIG. 1 is a block diagram conceptually illustrating an example of a telecommunications system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (WI-FI), IEEE 802.16 (WIMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

FIG. 1 shows a wireless communication network 100, which may be an LTE-A network. The wireless network 100 includes a number of evolved Node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. In addition, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. In addition, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous operation. For synchronous operation, the eNodeBs may have similar frame timing, and transmissions from different eNodeBs may be approximately aligned in time.

In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-EDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.4, 3, 5, 10, 15 or 20 MHz, respectively.

Figure 2:
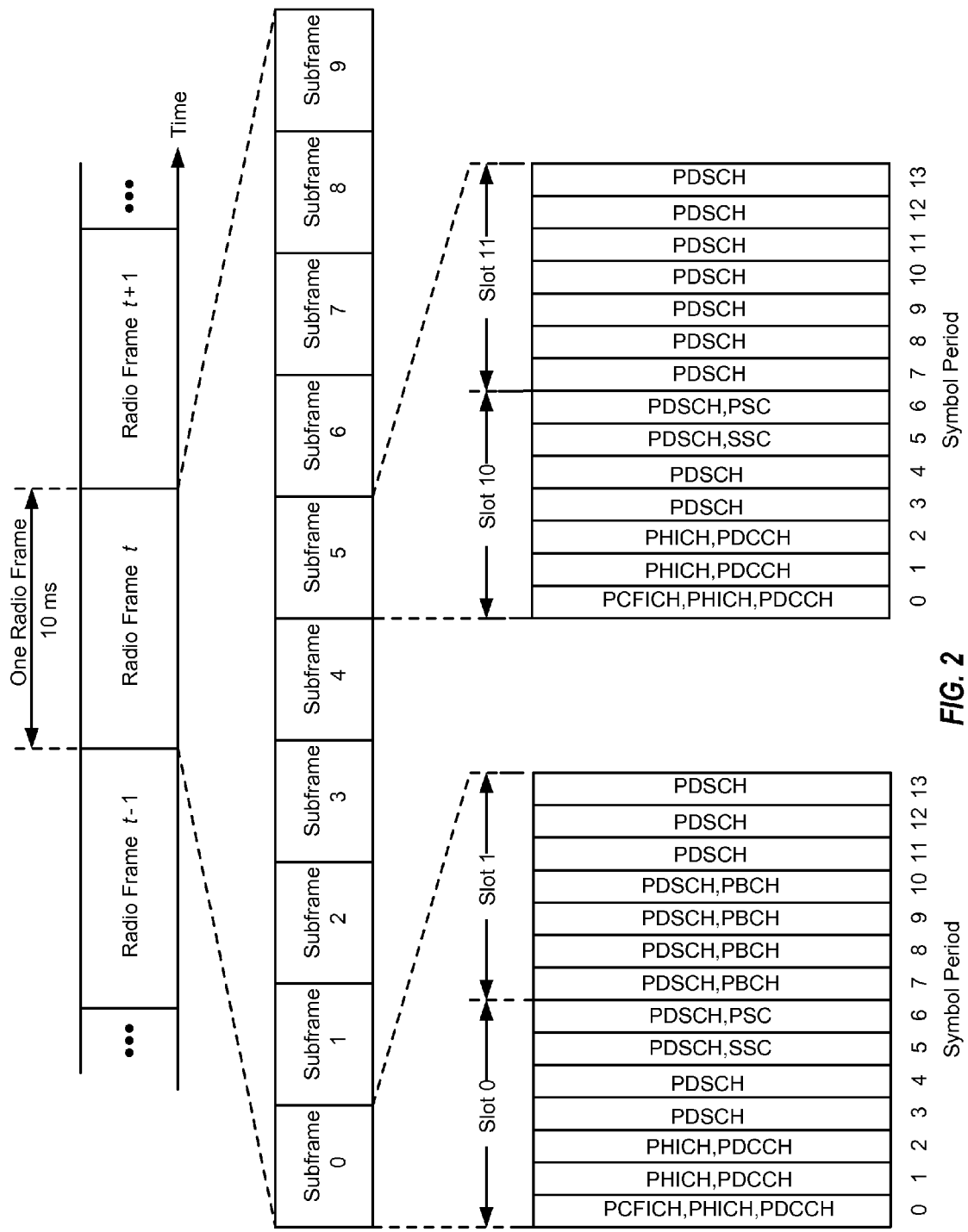
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
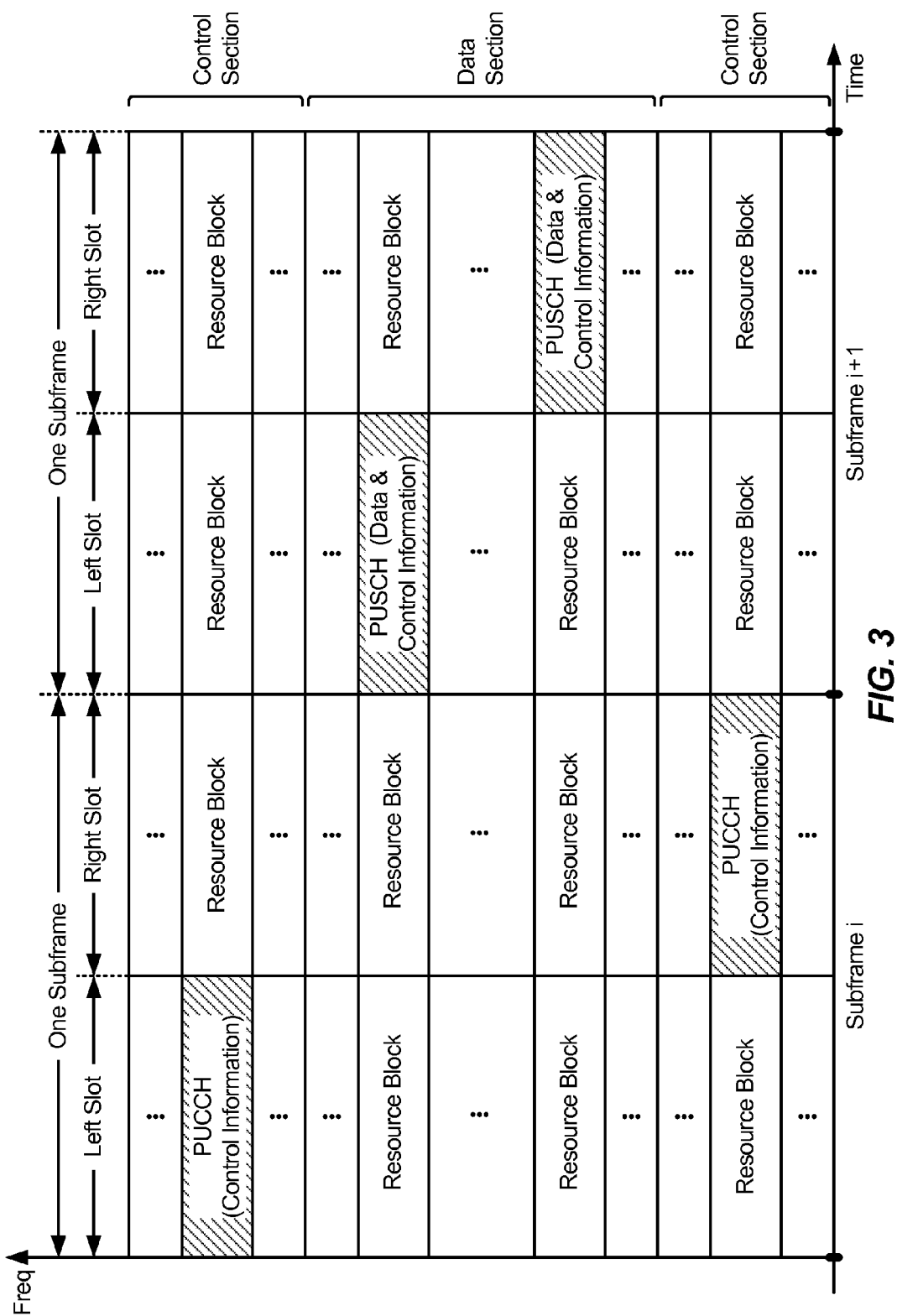
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC, SSC, CRS, DRS, PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
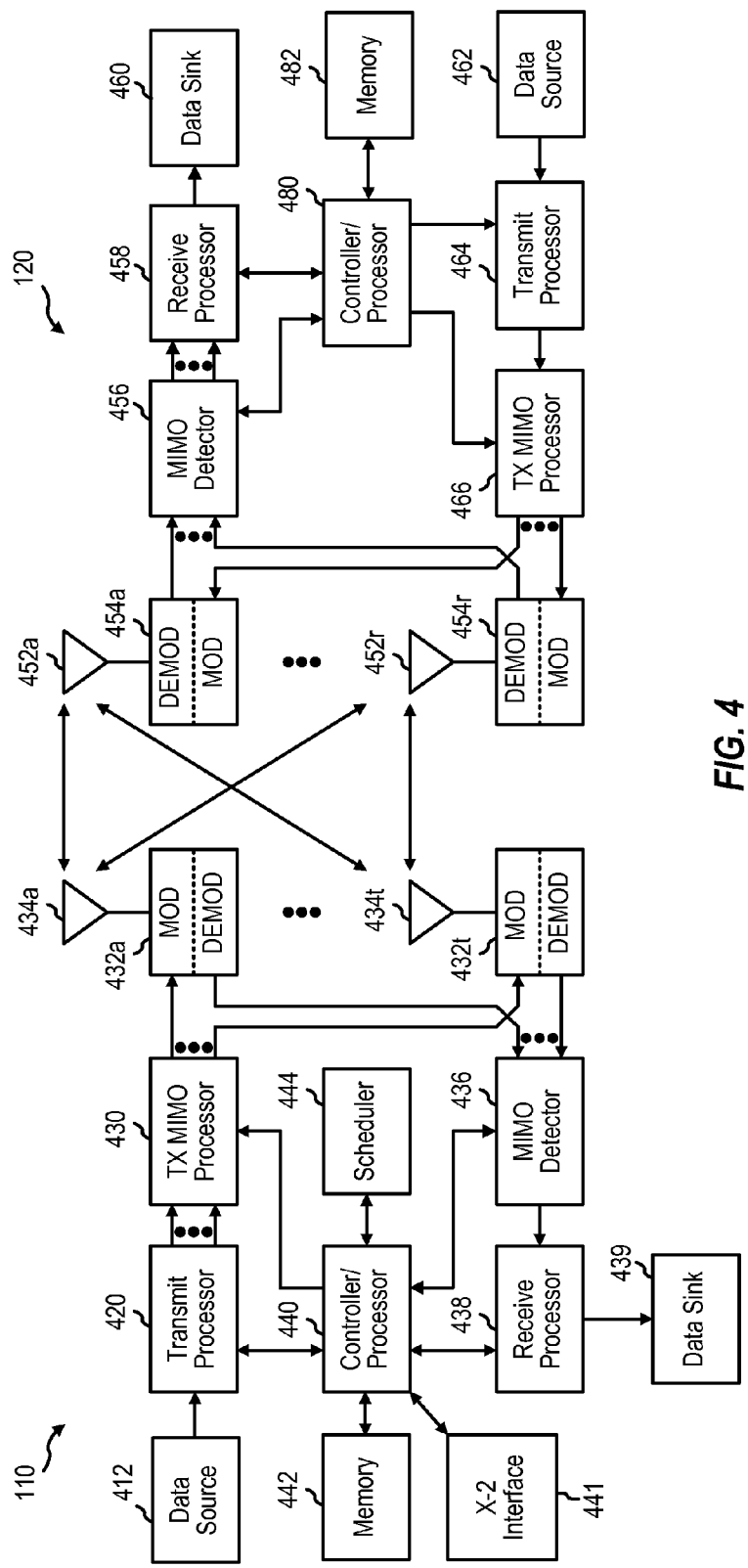
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. The base station 110 may be the macro eNodeB 110*c* in FIG. 1, and the UE 120 may be the UE 120*y*. The base station 110 may also be a base station of some other type. The base station 110 may be equipped with antennas 434*a* through 434*t*, and the UE 120 may be equipped with antennas 452*a* through 452*r*.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DEMODs) 454*a* through 454*r*, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in FIG. 11, and/or other processes for the techniques described herein. The memories 442 and 482 may store data and program codes for the base station 110 and the UE 120, respectively. A scheduler 444 may schedule UEs for data transmission on the downlink and/or uplink.

Figure 5:
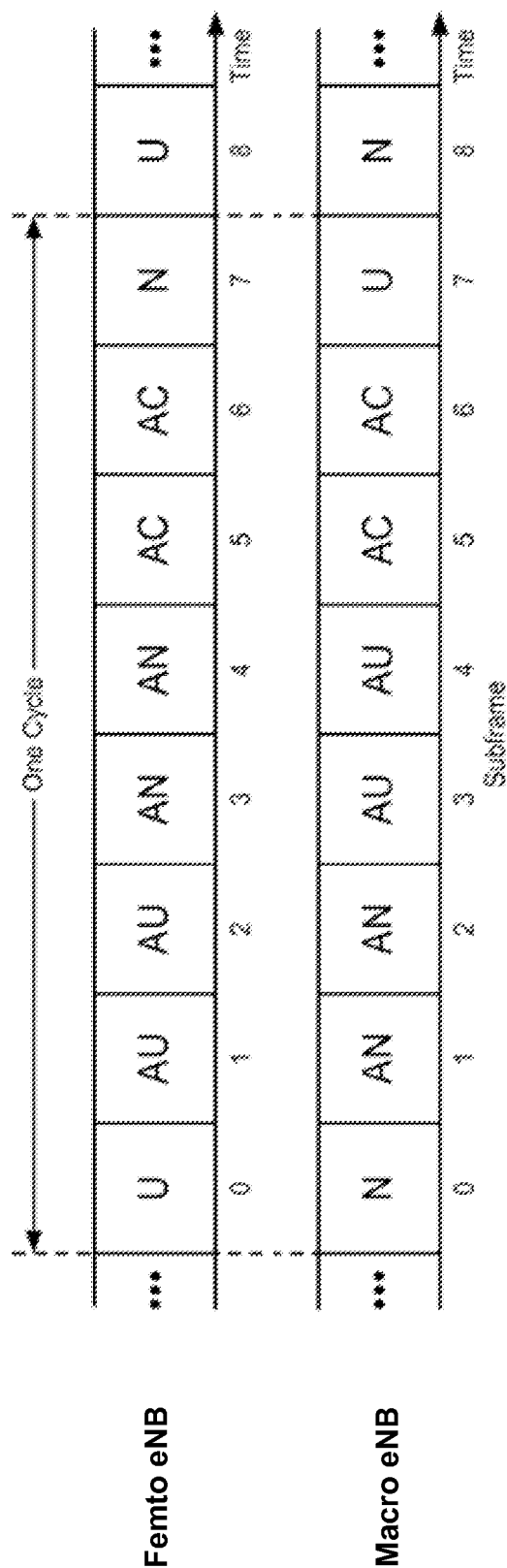
FIG. 5 is a block diagram conceptually illustrating adaptive resource partitioning in a heterogeneous network according to one aspect of the disclosure.

FIG. 5 is a block diagram illustrating TDM partitioning in a heterogeneous network according to one aspect of the disclosure. A first row of blocks illustrates sub frame assignments for a femto eNodeB, and a second row of blocks illustrates sub frame assignments for a macro eNodeB. Each of the eNodeBs has a static protected sub frame during which the other eNodeB has a static prohibited sub frame. For example, the femto eNodeB has a protected sub frame (U sub frame) in sub frame 0 corresponding to a prohibited sub frame (N sub frame) in sub frame 0. Likewise, the macro eNodeB has a protected sub frame (U sub frame) in sub frame 7 corresponding to a prohibited sub frame (N sub frame) in sub frame 7. Sub frames 1-6 are dynamically assigned as either protected sub frames (AU), prohibited sub frames (AN), and common sub frames (AC). During the dynamically assigned common sub frames (AC) in sub frames 5 and 6, both the femto eNodeB and the macro eNodeB may transmit data.

Protected sub frames (such as U/AU sub frames) have reduced interference and a high channel quality because aggressor eNodeBs are prohibited from transmitting. Prohibited sub frames (such as N/AN sub frames) have no data transmission to allow victim eNodeBs to transmit data with low interference levels. Common sub frames (such as C/AC sub frames) have a channel quality dependent on the number of neighbor eNodeBs transmitting data. For example, if neighbor eNodeBs are transmitting data on the common sub frames, the channel quality of the common sub frames may be lower than the protected sub frames. Channel quality on common sub frames may also be lower for extended boundary area (EBA) UEs strongly affected by aggressor eNodeBs. An EBA UE may belong to a first eNodeB but also be located in the coverage area of a second eNodeB. For example, a UE communicating with a macro eNodeB that is near the range limit of a femto eNodeB coverage is an EBA UE. This extended boundary area concept will also be referred to as "range expansion."

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNodeBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities, such as, for example, the network controller 130 (FIG. 1). This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

In deployments of heterogeneous networks, such as the wireless network 100, a UE may operate in a dominant interference scenario in which the UE may observe high interference from one or more interfering eNodeBs. A dominant interference scenario may occur due to restricted association. For example, in FIG. 1, the UE 120y may be close to the femto eNodeB 110y and may have high received power for the eNodeB 110y. However, the UE 120y may not be able to access the femto eNodeB 110y due to restricted association and may then connect to the macro eNodeB 110c (as shown in FIG. 1) or to the femto eNodeB 110z also with lower received power (not shown in FIG. 1). The UE 120y may then observe high interference from the femto eNodeB 110y on the downlink and may also cause high interference to the eNodeB 110y on the uplink. Using coordinated interference management, the eNodeB 110c and the femto eNodeB 110y may communicate over the backhaul to negotiate resources. In the negotiation, the femto eNodeB 110y agrees to cease transmission on one of its channel resources, such that the UE 120y will not experience as much interference from the femto eNodeB 110y as it communicates with the eNodeB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNodeBs. The eNodeBs in a synchronous system are presumptively synchronized across the system. However, for example, considering a UE that is a distance of 5 km from the macro eNodeB, the propagation delay of any downlink signals received from that macro eNodeB would be delayed approximately 16.67 μs (5 km÷3×108, i.e., the speed of light, 'c'). Comparing that downlink signal from the macro eNodeB to the downlink signal from a much closer femto eNodeB, the timing difference could approach the level of a time tracking loop (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Interference Cancellation

As noted above, in a co-channel heterogeneous network deployment, a UE may need to connect to a weak cell instead of a stronger cell. For example, in a range expansion situation, it is beneficial to associate a UE with a weak cell (e.g., a pico) that has a smaller path loss even though the received power from the weak cell is lower than that from the stronger cell (e.g., a macro). With restricted association (i.e., a Closed Subscriber Group (CSG) situation) the stronger cell (e.g., a femto) may not be accessible to the UE, and the UE therefore connects to a weaker cell (e.g., macro). In either case, the UE is under a strong interference condition, to which interference cancellation (IC) may be applied.

In an example, even when the UE is served by the stronger cell, such as in homogeneous networks, the UE may still subject to interference from neighboring cell transmissions.

In an exemplary LTE-A network, the term "cell" may associated with a logical cell definition per LTE-A standard. For example, in certain coordinated multipoint (COMP) deployment scenarios, a cell ID may span multiple geographical entities, including not only a macro sector but also pico cells and/or remote radio heads (RRH) within the macro sector. In such a deployment, a subset of antennas geographically collocated (e.g. all the antenna from the same pico cell) is often referred to as a transmission point. In such a deployment, in this application, we use the term "cell" to either refer to a transmission point or the entire logical cell, depending on where the control and/or data channel is transmitted. For example, certain control and data channels carrying DRS may be transmitted from a transmission point, in which case we use the term "cell" to refer to a transmission point. In another example, certain control and data channels not carrying DRS may be transmitted from all the transmit antennas belonging to a cell ID, although the antennas may not be geographically collocated. In such a case, we use the term "cell" to refer to the logical cell.

As described above, interference cancellation may be needed in various network deployments. For example, the interference cancellation may be applied to different channels, for example, but not limited to, Common Reference Signal (CRS), Dedicated Reference Signal (DRS), Channel State Information Reference Signal (CSI-RS), control channels (PCFICH, PHICH, PDCCH, R-PHICH, R-PDCCH, ePDCCH, etc), and data channels (PDSCH, R-PDSCH).

Certain channels, most notably Common Reference Signal (CRS) tones and/or DRS tones, have a known sequence. Thus, the channel of the cell to be cancelled can be estimated based on the CRS tones or DRS tones. For example, the UE uses the CRS and/or DRS tones transmitted from an eNB to obtain estimates of the channels between the eNB and the UE. The UE then reconstructs the CRS tones or DRS tones based on the channel estimates and the known sequence, and cancels out the CRS tones or DRS tones. In this document, the CRS and/or the DRS reconstruction and cancellation procedure is referred to as "RS interference cancellation."

Control channels (PBCH, PCFICH, PHICH, PDCCH, R-PHICH (relay-PHICH), R-PDCCH (relay-PDCCH), and the like) and some data channels (PDSCH, R-PDSCH (relay-PDSCH), and the like) have unknown payloads. For control channels and data channels that do not carry a Dedicated Reference Signal (DRS) tones (e.g., Demodulation Reference Signal (DMRS) tones), the UE relies on the channel estimates obtained from the CRS tones to decode, re-encode, reconstruct, and cancel out the channels. For control channels and data channels that have embedded DRS tones (e.g., Demodulation Reference Signal (DMRS) tones), the UE may rely on the channel estimates obtained from the DRS tones (e.g., Demodulation Reference Signal (DMRS) tones) to decode, re-encode, reconstruct, and cancel out the channels. Whether to use a CRS tones or a DRS tones (e.g., Demodulation Reference Signal (DMRS) tones) to obtain a channel estimate may be based at least in part on a type of the channel, transmission mode, and/or other parameters. For example, the Dedicated Reference Signal (DRS) tones may be transmitted for each channel based at least in part on a request. For example, as described above, DRS tones may be imbedded in a same resource block with the control/data channels in order to obtain a channel estimate of a corresponding channel. In this document, the control and/or data channel re-encoding, reconstruction, and cancellation procedure is referred to as "control/data channel interference cancellation".

There are various techniques to perform control/data channel interference cancellation. For example, the control/data channel interference cancellation may be Cyclic Redundancy Check (CRC)-based IC, wherein the control/data channel is cancelled out only if the decoded payload of the control/data channel passes the CRC. In another example, the control/data channel IC may be soft IC, wherein the control/data channel is cancelled out even when it does not pass the CRC, in which case the cancellation is based on soft reconstruction of the transmitted symbols.

In LTE/LTE-A, the CRS tones of one cell may collide with the CRS tones ("colliding CRS") or the control/data tones ("non-colliding CRS") of another cell. Whether the CRS tones of the serving cell collide with the CRS tones of the neighboring cell ("colliding CRS") depends on the cell IDs of the two cells. Because of the dependency of control/data channel interference cancellation on CRS tones, it would be beneficial to have different interference cancellation algorithms suitable for each of the colliding and non-colliding CRS scenarios.

In another example, in LTE/LTE-A, the DRS tones (e.g., Demodulation Reference Signal (DMRS) tones) of one cell may collide with the DRS tones (e.g., Demodulation Reference Signal (DMRS) tones) ("colliding DRS") or the control/data tones ("non-colliding DRS") of another cell. Whether the DRS tones (e.g., Demodulation Reference Signal (DMRS) tones) of the serving cell collide with the DRS tones (e.g., Demodulation Reference Signal (DMRS) tones) of the neighboring cell ("colliding DRS") may depend on a number of DRS tones in a grant, among other factors. For example, if the PDSCH transmission from a serving cell has two DRS ports and the PDSCH transmission from a neighboring cell has four DRS ports, a "non-colliding DRS scenario may be created. In another example, if PDSCH transmission from a serving cell has two DRS ports, while the PDSCH transmission from a neighboring cell is based on CRS tones (e.g., no DRS ports), a "non-colliding DRS" scenario may be created. Because of the dependency of control/data channel interference cancellation on DRS tones, it would be beneficial to have different interference cancellation algorithms suitable for each of the colliding and non-colliding DRS scenarios.

Figure 6A:
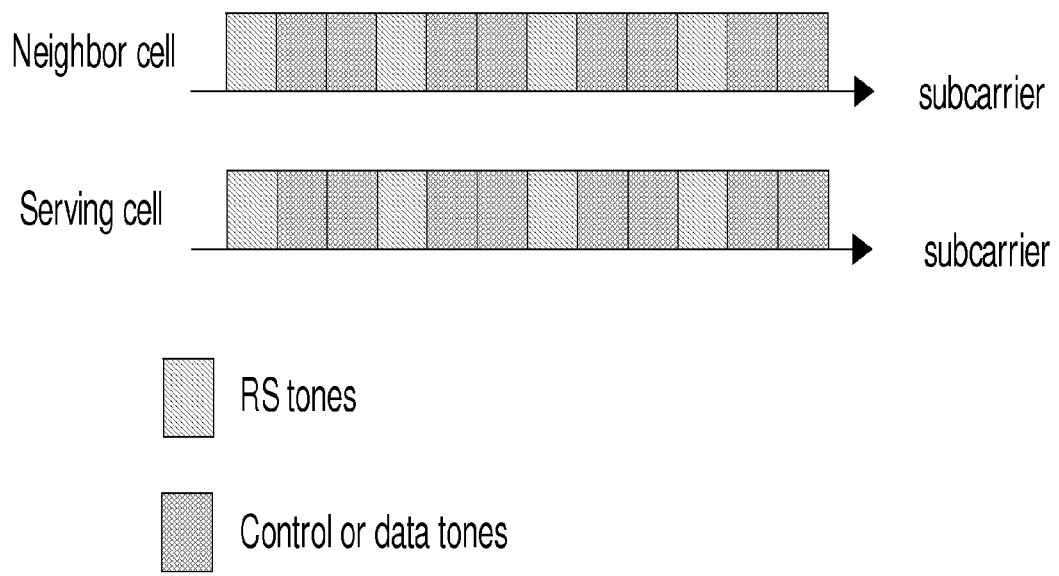
FIG. 6A is a block diagram conceptually illustrating a colliding Common Reference Signal (CRS) scenario before Interference Cancellation (IC) is performed, according to one aspect of the present disclosure.

FIG. 6A is a block diagram conceptually illustrating a colliding CRS scenario before interference cancellation is performed, according to one aspect of the present disclosure. In FIG. 6A, the horizontal axes represent frequency. Reference signal (e.g., CRS) tones and control/data tones are shown for a sub carrier of a neighbor cell and a serving cell. As shown in FIG. 6A, serving cell CRS tones see interference from the CRS tones of the neighbor cell. To improve interference cancellation results, according to one aspect the UE decouples CRS interference cancellation and control/data channel interference cancellation in a colliding CRS tone scenario. That is, the UE first performs CRS interference cancellation to estimate the serving cell channels and then proceeds with neighbor cell and serving cell control/data channel interference cancellation and decoding.

Figure 6B:
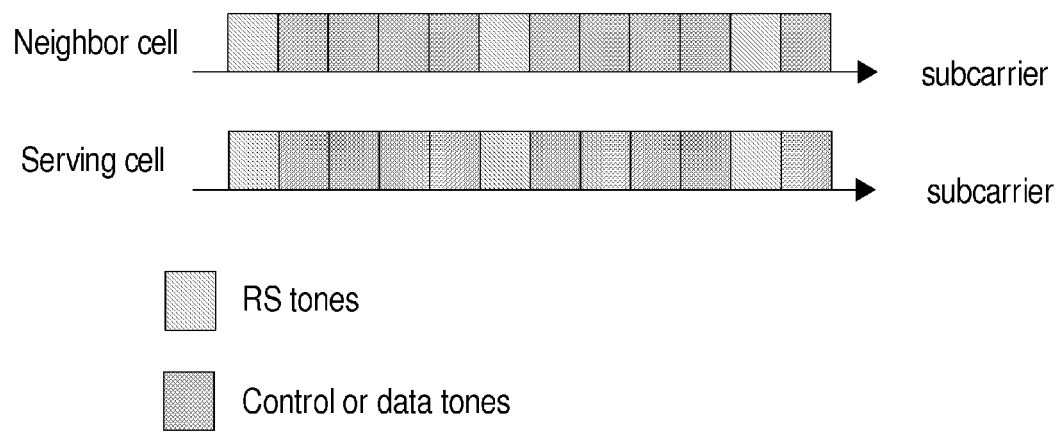
FIG. 6B is a block diagram conceptually illustrating a colliding Dedicated Reference Signal (DRS) scenario before Interference Cancellation (IC) is performed, according to one aspect of the present disclosure.

FIG. 6B is a block diagram conceptually illustrating a colliding DRS scenario before interference cancellation is performed, according to one aspect of the present disclosure. In FIG. 6B, the horizontal axes represent frequency. Reference signal (e.g., DRS) tones and control/data tones are shown for a sub carrier of a neighbor cell and a serving cell. As shown in FIG. 6B, serving cell DRS tones may see interference from the DRS tones of the neighbor cell. To improve interference cancellation results, the UE may decouple DRS interference cancellation and control/data channel interference cancellation in a colliding DRS tones (e.g., Demodulation Reference Signal (DMRS) tones) scenario. That is, the UE may first perform DRS (e.g., Demodulation Reference Signal (DMRS)) interference cancellation to estimate the serving cell channels and then proceeds with neighbor cell and serving cell control/data channel interference cancellation and decoding.

Figure 7A:
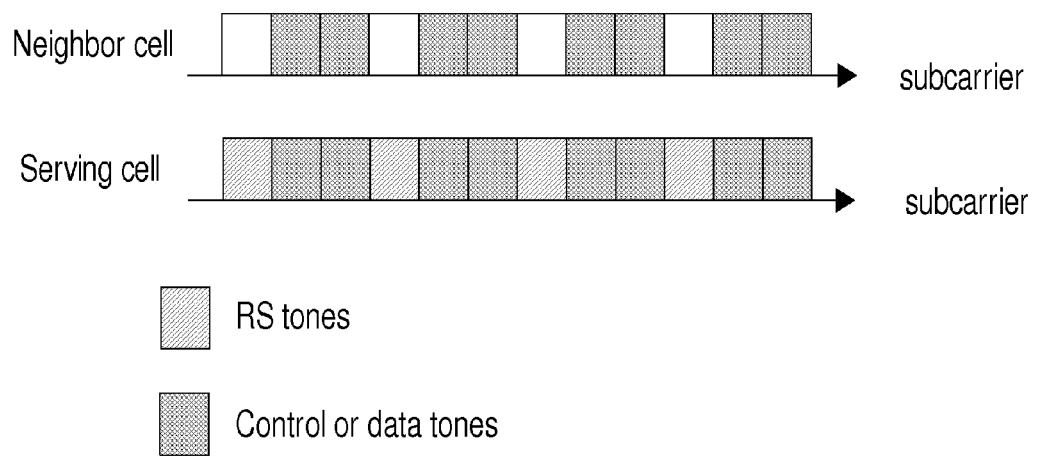
FIG. 7A is a block diagram conceptually illustrating a colliding CRS scenario after CRS interference cancellation is performed by the UE, according to one aspect of the present disclosure.

FIG. 7A is a block diagram conceptually illustrating a colliding CRS scenario after decoupled CRS interference cancellation is performed by the UE, according to one aspect of the present disclosure. After interference cancellation is performed based on the neighbor cell CRS tones (as shown in white), the serving cell CRS tones no longer see strong interference. Hence, serving cell channel estimation will be more accurate. Interference cancellation is then performed based on the neighbor cell control/data channel to cancel out the neighbor cell control/data channels and to accurately decode the serving cell control/data channels. In some examples, the processes are performed iteratively to add, for example, when the cells are of roughly equal strength.

Figure 7B:
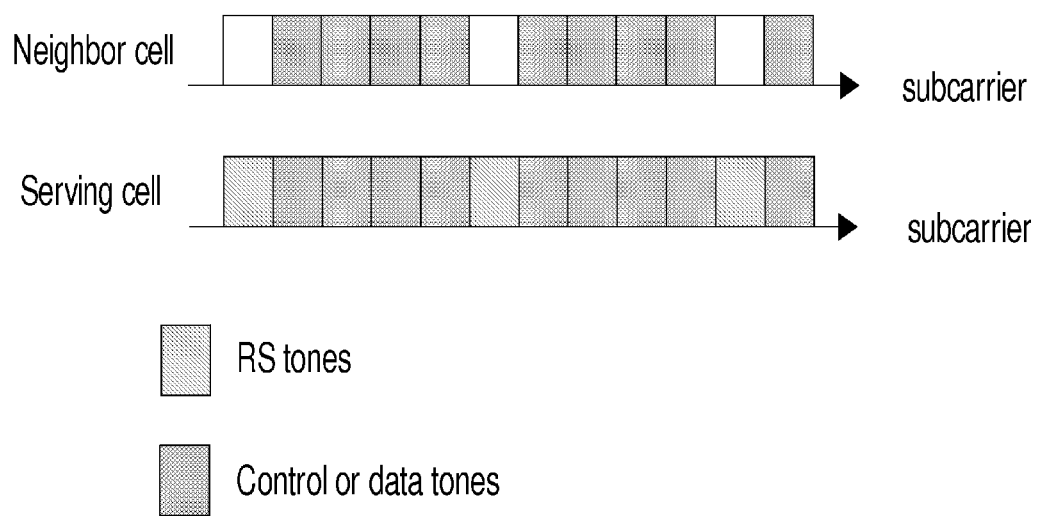
FIG. 7B is a block diagram conceptually illustrating a colliding DRS scenario after DRS interference cancellation is performed by the UE, according to one aspect of the present disclosure.

FIG. 7B is a block diagram conceptually illustrating a colliding DRS scenario after decoupled DRS interference cancellation is performed by the UE, according to one aspect of the present disclosure. After interference cancellation is performed based on the neighbor cell DRS tones (e.g., Demodulation Reference Signal (DMRS) tones) (as shown in white), the serving cell DRS tones (e.g., Demodulation Reference Signal (DMRS) tones) may no longer see strong interference. Hence, serving cell channel estimation will be more accurate. Interference cancellation is then performed based on the neighbor cell control/data channel to cancel out the neighbor cell control/data channels and to accurately decode the serving cell control/data channels. In some examples, the processes are performed iteratively to add, for example, when the cells are of roughly equal strength.

In one example, the UE performs the decoupled interference cancellation/channel estimation process as described above based on CRS tones and/or DRS tones according to the following order (e.g., when the neighboring cell is stronger):
1. Neighbor cell channel estimation;
2. Neighbor cell CRS interference cancellation and/or neighbor cell DRS interference cancellation;
3. Serving cell channel estimation;
4. For iterative interference cancellation (e.g., when the cells are of similar strength), perform serving cell CRS interference cancellation and/or perform serving cell DRS interference cancellation and repeat 1-4 a number of times in a well-known manner.
5. Neighbor cell control/data channel decoding;
6. Neighbor cell control/data channel interference cancellation;
7. Serving cell control/data channel decoding;
8. For iterative interference cancellation (e.g., when the cells are of similar strength), perform serving cell control/data channel interference cancellation and repeat 5-8 a number of times in a well-known manner.

The UE may want to proceed in the following order (e.g., when the cells are of similar strength, and the serving cell is slightly stronger):
1. Serving cell channel estimation;
2. Serving cell CRS interference cancellation and/or serving cell DRS interference cancellation;
3. Neighbor cell channel estimation;
4. Neighbor cell CRS interference cancellation and/or neighbor cell DRS interference cancellation and repeat 1-4 a number of times in a well-known manner;
5. Serving cell control/data channel decoding;
6. Serving cell control/data channel interference cancellation;
7. Neighbor cell control/data channel decoding;
8. Neighbor cell control/data channel interference cancellation and repeat 5-8 a number of times in a well-known manner.

Figure 8A:
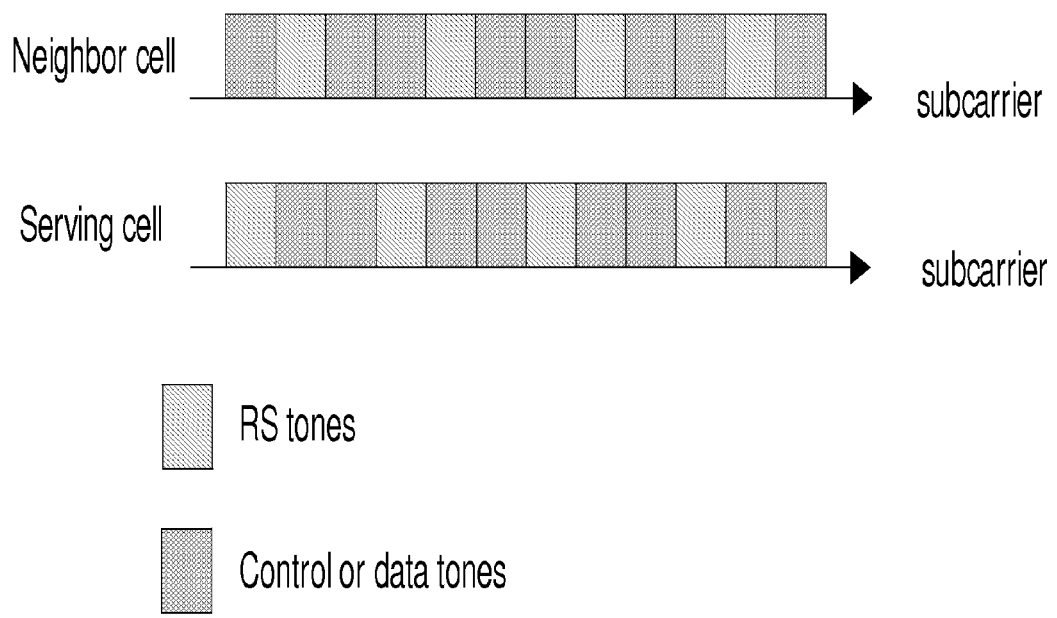
FIG. 8A is a block diagram conceptually illustrating a non-colliding CRS scenario before interference cancellation is performed, according to one aspect of the present disclosure.

FIG. 8A is a block diagram conceptually illustrating a non-colliding CRS scenario before interference cancellation is performed, according to one aspect of the present disclosure. Similar to FIG. 6A, in FIG. 8A, the horizontal axes represent frequency. Reference signal (e.g., CRS) tones and control/data tones are shown for a sub carrier of a neighbor cell and a serving cell. As shown in FIG. 8A, the serving cell receives interference for given serving cell CRS tones from neighbor cell control/data channel tones. Also, the interference for a given serving cell control/data channel includes interference from the neighboring cell CRS tones.

Figure 8B:
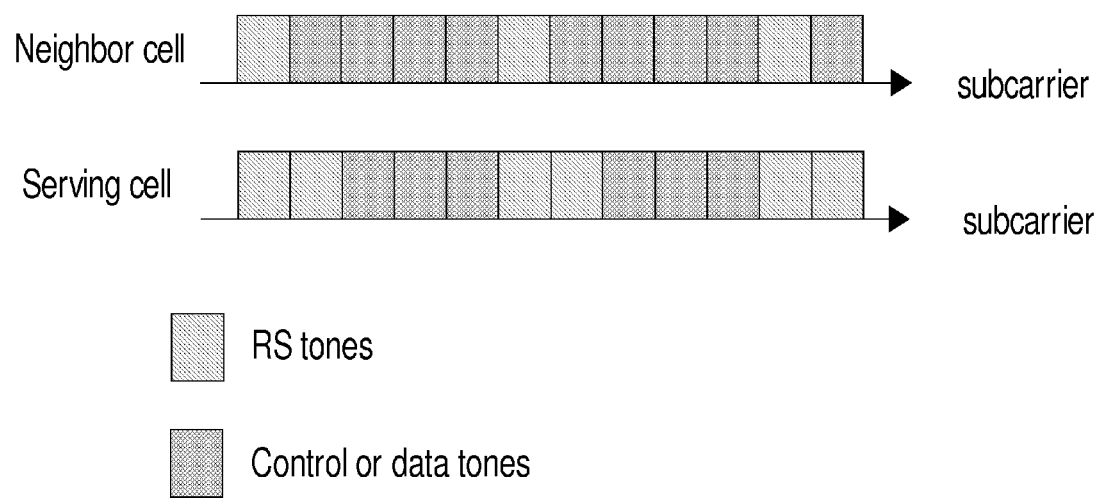
FIG. 8B is a block diagram conceptually illustrating a non-colliding DRS scenario before interference cancellation is performed, according to one aspect of the present disclosure.

FIG. 8B is a block diagram conceptually illustrating a non-colliding DRS scenario before interference cancellation is performed, according to one aspect of the present disclosure. Similar to FIG. 6B, in FIG. 8B, the horizontal axes represent frequency. Reference signal (e.g., DRS) tones and control/data tones are shown for a sub carrier of a neighbor cell and a serving cell. As shown in FIG. 8B, the serving cell receives interference for given serving cell DRS tones (e.g., Demodulation Reference Signal (DMRS) tones) from neighbor cell control/data channel tones. Also, the interference for a given neighboring cell control/data channel includes interference from the serving cell DRS tones (e.g., Demodulation Reference Signal (DMRS) tones).

In this case, the channel estimation of the serving cell will not be accurate unless the neighbor cell control/data channels that interfere with the serving cell CRS tones and/or interfere with the serving cell DRS tones (e.g., Demodulation Reference Signal (DMRS) tones) are cancelled out first. Furthermore, the serving cell control/data channel decoding, which relies on the serving cell channel estimation, will also likely to fail without cancelling interference from the neighbor cell. One approach to solve this problem is to cancel out the neighbor cell control/data channels and CRS tones and/or DRS tones (e.g., Demodulation Reference Signal (DMRS) tones) altogether, before proceeding with the serving cell channel estimation. That is, rather than decoupling CRS/DRS tones and data/control channel interference cancellation, all channels of a cell are processed before proceeding with the next cell. In other words, the approach includes performing interference cancellation on all CRS/DRS and control/data channels of one cell before proceeding to another cell. For example, such technique may include the following (e.g., when the neighboring cell is stronger):
1. Neighbor cell channel estimation;
2. Neighbor cell control/data channel decoding;
3. Neighbor cell CRS/DRS interference cancellation and control/data channel interference cancellation;
4. Serving cell channel estimation;
5. Serving cell control/data channel decoding;
6. For iterative interference cancellation (e.g., when the cells are of similar strength), serving cell CRS/DRS interference cancellation and control/data channel interference cancellation, and repeat 1-6 a number of times in a well-known manner.

Figure 9A:
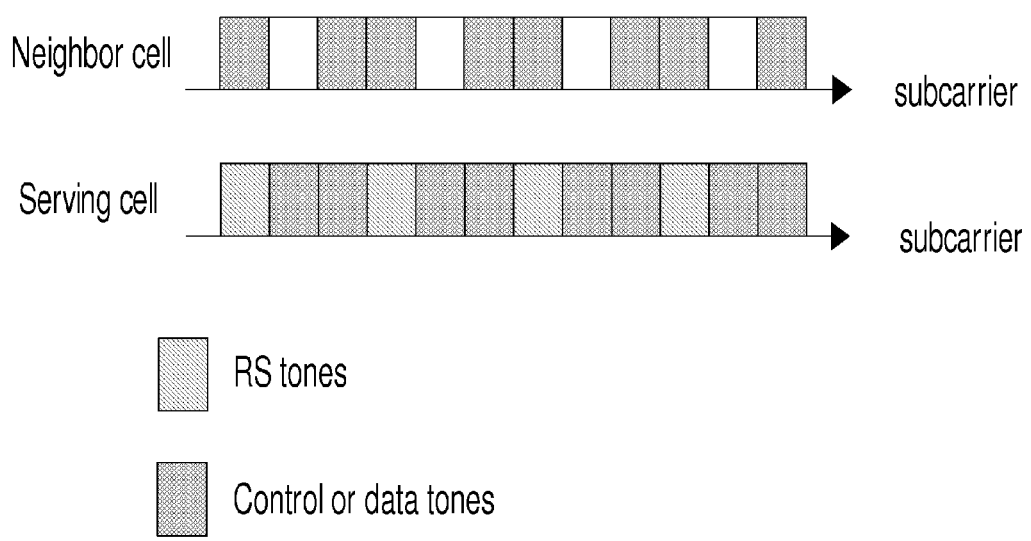
FIG. 9A is a block diagram conceptually illustrating a non-colliding CRS scenario after interference cancellation is performed on the neighbor cell CRS tone, according to one aspect of the present disclosure.

Similar to the cases described above, the ordering 1-3 and 4-6 may be switched if the serving cell is slightly stronger than the neighboring cell FIG. 9A is a block diagram conceptually illustrating a non-colliding CRS scenario after interference cancellation is performed on the neighbor cell CRS tones, according to one aspect of the present disclosure. After interference cancellation is used to cancel out the neighbor cell's CRS tones, serving cell CRS tones still see strong interference from the neighbor cell's control/data tones. Hence, serving cell channel estimation will still be poor even though some interference cancellation has been performed.

Figure 9B:
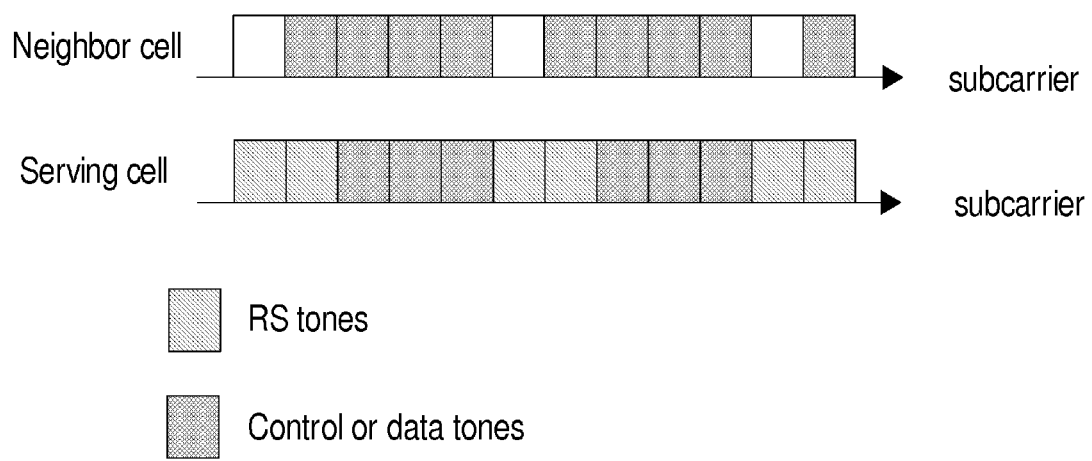
FIG. 9B is a block diagram conceptually illustrating a non-colliding DRS scenario after interference cancellation is performed on the neighbor cell DRS tone, according to one aspect of the present disclosure.

FIG. 9B is a block diagram conceptually illustrating a non-colliding DRS scenario after interference cancellation is performed on the neighbor cell DRS tones, according to one aspect of the present disclosure. After interference cancellation is used to cancel out the neighbor cell's DRS tones (e.g., Demodulation Reference Signal (DMRS) tones), serving cell DRS tones (e.g., Demodulation Reference Signal (DMRS) tones) still see strong interference from the neighbor cell's control/data tones. Hence, serving cell channel estimation will still be poor even though some interference cancellation has been performed.

Figure 10A:
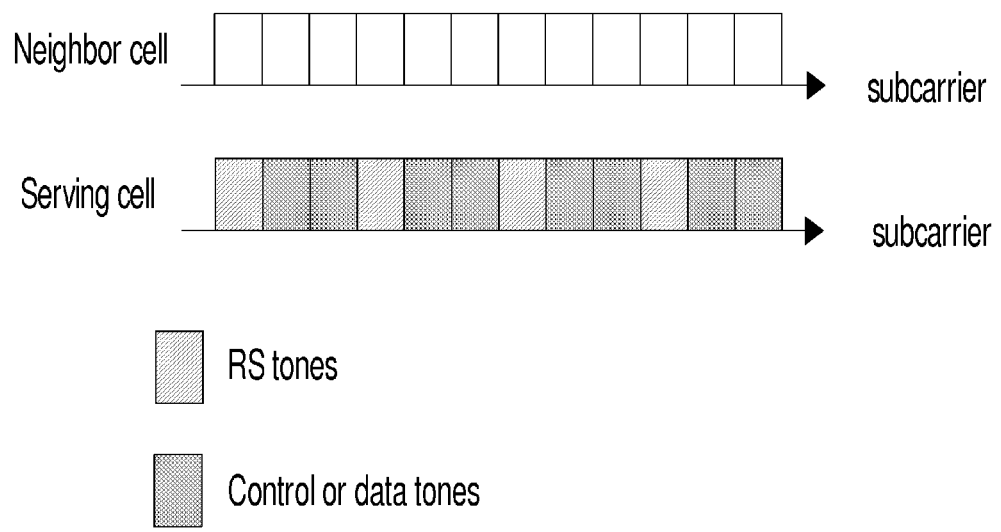
FIG. 10A is a block diagram conceptually illustrating a non-colliding CRS scenario after interference cancellation is performed on the neighbor cell CRS tone and on the neighbor cell control/data channels, according to one aspect of the present disclosure.

FIG. 10A is a block diagram conceptually illustrating a non-colliding CRS scenario after interference cancellation is performed on the neighbor cell CRS tones and on the neighbor cell control/data channels, according to one aspect of the present disclosure. After neighbor cell CRS interference cancellation and control/data cell interference cancellation, serving cell CRS tones no longer see strong interference. Serving cell channel estimation can then benefit from decreased interference.

Figure 10B:
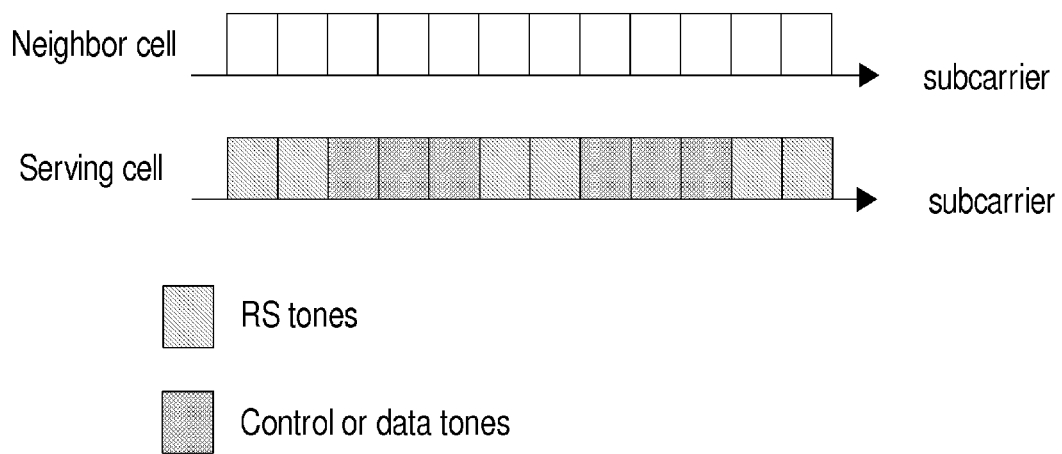
FIG. 10B is a block diagram conceptually illustrating a non-colliding DRS scenario after interference cancellation is performed on the neighbor cell DRS tone and on the neighbor cell control/data channels, according to one aspect of the present disclosure.

FIG. 10B is a block diagram conceptually illustrating a non-colliding DRS scenario after interference cancellation is performed on neighbor cell DRS tones (e.g., Demodulation Reference Signal (DMRS) tones) and on the neighbor cell control/data channels, according to one aspect of the present disclosure. After neighbor cell DRS interference cancellation and control/data cell interference cancellation, serving cell DRS tones (e.g., Demodulation Reference Signal (DMRS) tones) may no longer see strong interference. Serving cell channel estimation can then benefit from decreased interference.

The approach of FIGS. 8-10 also works for a colliding CRS scenario and/or a colliding DRS scenario, but the approach of FIGS. 6 and 7 may be selected for colliding CRS scenarios and/or colliding DRS scenarios for one or more reasons. It is generally the case that the approach of FIGS. 8-10 has a higher complexity than the approach of FIGS. 6 and 7. Furthermore, if an iterative interference cancellation approach is employed in a colliding CRS scenario and/or a colliding DRS scenario, it may be advantageous to use the approach of FIGS. 6 and 7 to reduce the number of iterations in control/data channel interference cancellation. Specifically, in an iterative approach of FIGS. 6 and 7, the control/data channel decoding on the serving and neighbor cells are performed with the final channel estimates that are obtained after all the CRS and/or DRS interference cancellation iterations are completed, whereas in an iterative approach according to FIGS. 8-10, the control/data channel decoding of the serving and neighbor cells are performed with intermediate channel estimates that are available on the given iteration. Because the intermediate channel estimates are less accurate than the final channel estimates, it is desirable to implement more iterations for the approach according to FIGS. 8-10 than for the approach according to FIGS. 6-7.

In various aspects, the UE may adaptively apply a particular approach for a given scenario. Thus, in one example, the UE may choose one of the algorithms depending on the cell IDs the UE sees, where cell IDs indicate whether the interference includes colliding CRS tones. In another example, the UE may adaptively apply a particular approach for a given scenario and for a given resource block (RB) based at least in part on whether the DRS tones (e.g., Demodulation Reference Signal (DMRS) tones) of a serving cell on given RB fully collides with DRS tones (e.g., Demodulation Reference Signal (DMRS) tones) of a neighboring cell on the RB. The DMRS ports information may be known to UE or UE may detect (e.g., blind detection) DMRS ports.

In case the UE sees more than two interferers, some of which having colliding CRS and/or DRS positions with the serving cell while the others having non-colliding CRS and/or DRS positions, the UE can use the approach of FIGS. 8-10, with optional interference cancellation according to FIGS. 6 and 7, among cells that have colliding CRS and/or colliding DRS.

Figure 11:
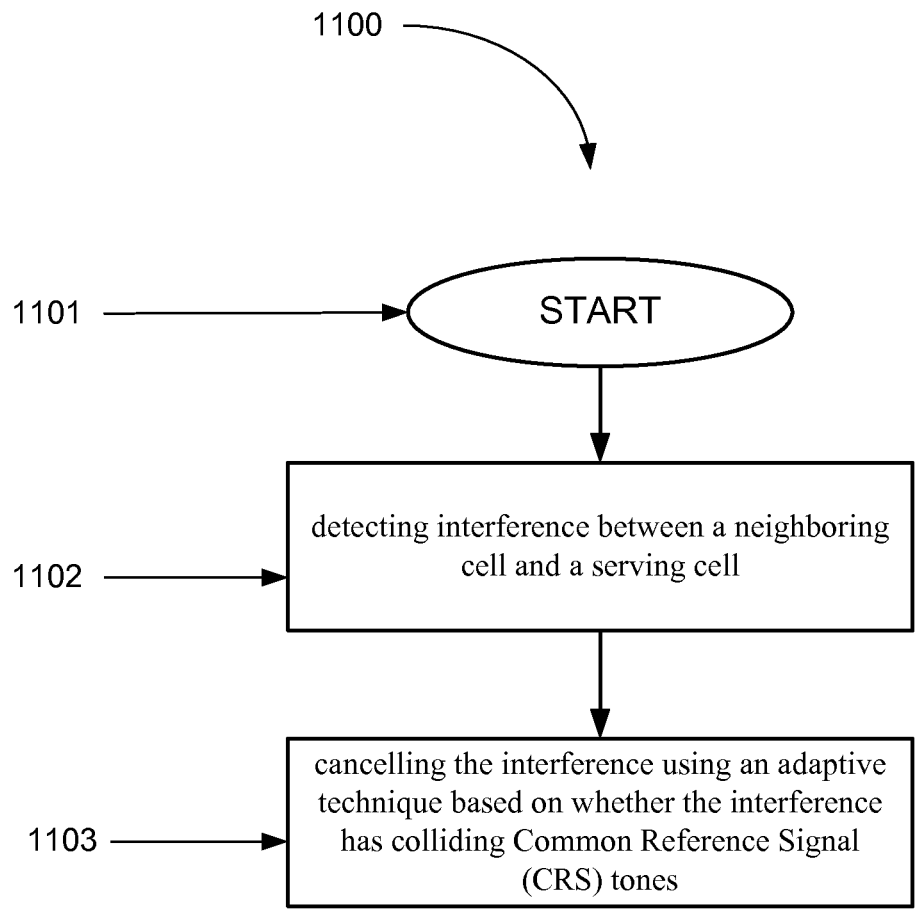
FIG. 11 is a functional block diagram illustrating example blocks executed to implement one aspect of the present disclosure.

FIG. 11 is a functional block diagram illustrating example blocks executed to implement one aspect of the present disclosure. The process 1100 may be performed, for example, by a UE that experiences interference from one or more neighboring cells. The process 1100 starts at block 1101. At block 1102, interference may be detected between a neighboring cell and a serving cell. At block 1103, the interference may be canceled using an adaptive technique based on whether the interference has colliding Common Reference Signal (CRS) tones. Also, the interference may be canceled using an adaptive technique based on whether the interference has colliding Dedicated Reference Signal (DRS) tones (e.g., Demodulation Reference Signal (DMRS) tones).

In one configuration, the UE 120 is configured for wireless communication including means for detecting interference between a neighboring cell and a serving cell. In one aspect, the detecting means may be the antenna 452a-r, demodulators 454a-r receive processor 458, controller/processor 480, and memory 482 configured to perform the functions recited by the detecting means. The UE 120 is also configured to include a means for cancelling the interference using an adaptive technique based on whether the interference has colliding Common Reference Signal (CRS) tones. The UE 120 may be configured to include a means for cancelling the interference using an adaptive technique based on whether the interference has colliding Dedicated Reference Signal (DRS) tones (e.g., Demodulation Reference Signal (DMRS) tones). In one aspect, the cancelling means may be the controller/processor 480, and memory 482 configured to perform the functions recited by the cancelling means. In another aspect, the aforementioned means may be a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for cancelling interference in a wireless network, the method comprising:
   detecting interference between a neighboring cell and a serving cell; and
   cancelling the interference based at least in part on the interference being from a Dedicated Reference Signal (DRS) tone of the neighboring cell colliding with a DRS tone of the serving cell and the DRS tone of the neighboring cell colliding with at least one of a control tone or a data tone of the serving cell;
   wherein cancelling the interference comprises:
      estimating a channel of the neighboring cell based at least in part on a Dedicated Reference Signal (DRS) tone of the neighboring cell;
      cancelling the interference from the neighboring cell DRS tone to estimate a serving cell channel; and
      estimating the serving cell channel.

2. The method of claim 1, further comprising:
   estimating at least one of a neighboring cell control channel and a neighboring cell data channel;
   cancelling interference, using the estimated at least one of the neighboring cell control channel and the neighboring cell data channel, from the at least one of the neighboring cell control channel and the neighboring cell data channel; and
   decoding at least one of the serving cell control channel and the serving cell data channel.

3. The method of claim 1, further comprising:
   iteratively estimating neighboring cell channels and serving cell channels by iterative interference cancellation on the DRS tone of the serving cell and the DRS tone of the neighboring cell.

4. The method of claim 2, further comprising:
   iteratively estimating and cancelling at least one of (i) the serving cell control channel and the serving cell data channel and (ii) the neighboring cell control channel and the neighboring cell data channel.

5. The method of claim 1, wherein cancelling the interference is further based at least in part on a received power strength of the neighboring cell and a received power strength of the serving cell.

6. The method of claim 1, wherein estimating the serving cell channel is based at least in part on a DRS tone of the serving cell channel.

7. An apparatus to enhance coverage in a wireless network, comprising:
- a memory; and
- at least one processor coupled to the memory and configured:
  - to detect interference between a neighboring cell and a serving cell; and
  - to cancel the interference based at least in part on the interference being from a Dedicated Reference Signal (DRS) tone of the neighboring cell colliding with a DRS tone of the serving cell and the DRS tone of the neighboring cell colliding with at least one of a control tone or a data tone of the serving cell;
  - in which the at least one processor is further configured to cancel interference by:
    - estimating a channel of the neighboring cell based at least in part on a Dedicated Reference Signal (DRS) tone of the channel of the neighboring cell;
    - cancelling the interference from the neighboring cell DRS tone to estimate a serving cell channel; and
    - estimating the serving cell channel.

8. The apparatus of claim 7, wherein the at least one processor is further configured to cancel interference by:
- estimating at least one of a neighboring cell control channel and a neighboring cell data channel;
- cancelling interference, using the decoded/estimated at least one of the neighboring cell control channel and the neighboring cell data channel, from the at least one of the neighboring cell control channel and the neighboring cell data channel; and
- decoding at least one of the serving cell control channel and the serving cell data channel.

9. The apparatus of claim 7, wherein the at least one processor is further configured to cancel interference by:
- iteratively estimating neighboring cell channels and serving cell channels by iterative interference cancellation on the DRS tone of the serving cell and the DRS tone of the neighboring cell.

10. The apparatus of claim 7, wherein the at least one processor is further configured to cancel interference by:
- iteratively estimating and cancelling at least one of (i) the serving cell control channel and the serving cell data channel and (ii) the neighboring cell control channel and the neighboring cell data channel.

11. The apparatus of claim 7, wherein the at least one processor is further configured to cancel the interference is further based at least in part on a received power strength of the neighboring cell and a received power strength of the serving cell.

12. The apparatus of claim 7, wherein the at least one processor is further configured to estimate the serving cell channel is based at least in part on a DRS tone of the serving cell channel.

* * * * *